(12) United States Patent
Sternberg (10) Patent No.: US 11,746,476 B2
(45) Date of Patent: Sep. 5, 2023

(54) SUBSURFACE IRRIGATION SYSTEM FOR A SPORTS FIELD

(71) Applicant: CAPILLARY CONCRETE, LLC, Celebration, FL (US)

(72) Inventor: Martin Sternberg, Celebration, FL (US)

(73) Assignee: CAPILLARY CONCRETE, LLC, Celebration, FL (US)

( * ) Notice: Subject to any disclaimer, the term of this patent is extended or adjusted under 35 U.S.C. 154(b) by 161 days.

(21) Appl. No.: 17/103,037

(22) Filed: Nov. 24, 2020

(65) Prior Publication Data
US 2021/0156095 A1 May 27, 2021

Related U.S. Application Data

(60) Provisional application No. 62/939,917, filed on Nov. 25, 2019.

(51) Int. Cl.
*E01C 13/08* (2006.01)
*A01G 25/06* (2006.01)
*A01G 25/00* (2006.01)

(52) U.S. Cl.
CPC ............ *E01C 13/083* (2013.01); *A01G 25/06* (2013.01); *A01G 2025/003* (2013.01)

(58) Field of Classification Search
CPC ....... E01C 13/08; E01C 13/083; A01G 25/06; A01G 2025/003; A01G 27/04; A01G 25/16
See application file for complete search history.

(56) References Cited

U.S. PATENT DOCUMENTS

| | | | |
|---|---|---|---|
| 1,906,494 A | 5/1933 | Steward | |
| 2,026,052 A | 12/1935 | Macleod | |
| 3,307,360 A | 3/1967 | Bailey | |
| 4,065,926 A * | 1/1978 | Brandt | A01G 25/06 47/1.01 R |
| 4,462,184 A | 7/1984 | Cunningham | |
| 4,523,755 A | 6/1985 | Turba | |
| 4,576,511 A | 3/1986 | Vidal, Jr. | |

(Continued)

FOREIGN PATENT DOCUMENTS

| | | |
|---|---|---|
| CN | 1057590 | 1/1992 |
| CN | 107035672 | 8/2017 |

(Continued)

*Primary Examiner* — Benjamin F Fiorello
(74) *Attorney, Agent, or Firm* — ADD+G, P.A.

(57) ABSTRACT

A subsurface irrigation system for a sports field includes a substantially water impermeable layer, a compacted subgrade below the water impermeable layer, a plurality of water distribution boards positioned on top of the water impermeable layer, a porous layer overlaying the plurality of water distribution boards, and a sports field layer on top of the porous layer. The porous layer is configured to move water from the plurality of water distribution boards upwards to the sports field layer using capillary action to keep it damp. The sports field layer may be sand, dirt, clay, or a combination thereof. In addition, the system may include a water control basin in fluid communication with at least one water distribution board of the plurality of water distribution boards and configured to control the flow of water to the plurality of water distribution boards.

17 Claims, 6 Drawing Sheets

(56) References Cited

U.S. PATENT DOCUMENTS

| | | | |
|---|---|---|---|
| 4,878,780 A | 11/1989 | Vidal | |
| 5,590,980 A | 1/1997 | Daniel | |
| 5,634,294 A * | 6/1997 | Rohoza | E01C 13/083 47/1.01 R |
| 5,839,659 A * | 11/1998 | Murray | A01G 25/06 239/145 |
| 5,938,372 A | 8/1999 | Lichfield | |
| 5,944,444 A | 8/1999 | Motz et al. | |
| 6,095,718 A | 8/2000 | Bohnhoff | |
| 6,161,776 A * | 12/2000 | Byles | A01G 20/00 405/36 |
| 6,419,422 B1 | 7/2002 | Wachtel | |
| 7,114,877 B2 | 10/2006 | Wilkerson | |
| 7,638,065 B2 | 12/2009 | Stever et al. | |
| 7,699,562 B2 | 4/2010 | Clark | |
| 7,866,918 B2 | 1/2011 | Otto | |
| 9,095,763 B2 | 8/2015 | Sternberg | |
| 9,476,166 B2 | 10/2016 | Hydock | |
| 10,264,741 B2 | 4/2019 | Sternberg | |
| 2003/0077123 A1 * | 4/2003 | Moulton | A01G 25/06 405/51 |
| 2003/0082004 A1 | 5/2003 | Wilkerson | |
| 2003/0082359 A1 * | 5/2003 | Scott | E01C 13/02 428/221 |
| 2003/0118403 A1 | 6/2003 | Wilkerson | |
| 2004/0005193 A1 | 1/2004 | Mazzei | |
| 2006/0051161 A1 | 3/2006 | Benson | |
| 2007/0278142 A1 | 12/2007 | Clark | |
| 2008/0098652 A1 | 5/2008 | Weinbel | |
| 2008/0292865 A1 | 11/2008 | Ball et al. | |
| 2009/0011873 A1 * | 1/2009 | Weber | E01C 13/08 473/497 |
| 2010/0093454 A1 | 4/2010 | Ball et al. | |
| 2012/0216457 A1 | 8/2012 | Robb | |
| 2012/0230777 A1 * | 9/2012 | Ayers | E02B 3/126 405/302.7 |
| 2013/0075490 A1 * | 3/2013 | Roess | A01G 25/06 239/145 |
| 2013/0183097 A1 | 7/2013 | Scantling | |
| 2014/0124418 A1 | 5/2014 | Ishihara | |
| 2016/0073596 A1 | 3/2016 | Pals | |
| 2016/0295817 A1 | 10/2016 | Pujadas | |
| 2017/0094919 A1 | 4/2017 | Sternberg | |
| 2018/0092311 A1 * | 4/2018 | Gietl | A01G 25/167 |
| 2019/0169803 A1 * | 6/2019 | Fellars | E01C 13/02 |
| 2019/0390414 A1 * | 12/2019 | Bacher | E01C 3/006 |
| 2020/0002900 A1 * | 1/2020 | Bissonnette | B32B 5/16 |

FOREIGN PATENT DOCUMENTS

| | | |
|---|---|---|
| DE | 102008044395 | 6/2010 |
| EP | 3355686 | 8/2018 |
| FR | 2556381 | 6/1985 |
| GB | 2245132 | 1/1992 |
| JP | S63117780 | 5/1988 |
| JP | H05272109 | 10/1993 |
| JP | H08302800 | 11/1996 |
| JP | H0995903 | 4/1997 |
| JP | 2000170113 | 6/2000 |
| JP | 2001146703 | 5/2001 |
| JP | 3253231 | 2/2002 |
| JP | 2004107101 | 4/2004 |
| JP | 2004211368 | 7/2004 |
| JP | 2005068887 | 3/2005 |
| JP | 2009538703 | 11/2009 |
| JP | 2010144439 | 7/2010 |
| JP | 2002339310 | 11/2012 |
| WO | WO8500631 | 2/1985 |
| WO | WO2005026442 | 3/2005 |
| WO | WO2007070913 | 6/2007 |
| WO | WO2012036612 | 3/2012 |
| WO | WO2017055575 | 4/2017 |

\* cited by examiner

SUBSURFACE IRRIGATION SYSTEM FOR A SPORTS FIELD

CROSS-REFERENCE TO RELATED APPLICATIONS

This application claims the benefit of U.S. provisional application No. 62/939,917 filed Nov. 25, 2019, which is hereby incorporated herein in its entirety by reference.

TECHNICAL FIELD

The present invention relates to irrigation systems, and more specifically to a subsurface irrigation system for a sports field.

BACKGROUND

Irrigation systems and irrigation methods have been under constant development for thousands of years, efficient water management has many times been an overall goal when new systems and methods have been introduced. There is a constantly growing need for better irrigation systems and irrigation methods in order to maximize water use efficiency and at the same time minimizing water losses, e.g. due to evaporation.

It is known in the art to provide sub-surface irrigation system in which tubes/pipes or tubes with drippers/emitters are utilized to distribute water at predetermined positions. However, systems like these are often very complicated and costly, and furthermore pose great challenges when trying to achieve a completely uniform spread of water across a large area. Moreover, they often require significant lengths of pipes or tubes which may be troublesome when it comes to maintenance and repairs.

There is therefore a need for an improved method and system for subsurface irrigation, which allows for increased water use efficiency, reduced maintenance and at the same time improves cost-efficiency.

SUMMARY

According to a first aspect of the present invention, there is provided a subsurface irrigation system for a sports field. The subsurface irrigation system includes a substantially water impermeable layer, a plurality of water distribution boards positioned on top of the water impermeable layer, a porous layer overlaying the water impermeable layer and the plurality of water distribution boards, and a sports field layer on top of the porous layer. The porous layer is configured to move water from the plurality of water distribution boards upwards to the sports field layer using capillary action. The sports field layer may be sand, dirt, clay, or a combination thereof, for example. In addition, the system may include using a compacted subgrade below the water impermeable layer and that is configured to carry the water impermeable layer. The water impermeable layer may be a plastic or rubber liner, for example.

A water control basin is in fluid communication with at least one water distribution board of the plurality of water distribution boards and is used to control the flow of water to the distribution boards. The sports field layer may also include artificial turf or natural grass.

The plurality of water distribution boards may each comprise an inlet and a plurality of feeders, where the feeders of each of the water distribution boards are configured to distribute water uniformly from the inlet to outer edges of a respective water distribution board.

The porous layer may comprise a mixture of cement and particulate stone material such as e.g. Capillary Concrete™, which is commercially available by the applicant, Capillary Concrete, LLC. The system may also include a pump for addition and/or removal of liquid into/from the water control basin. This facilitates the controlling of the moisture level of the porous layer, and if it were to be combined with at least one sensor for detecting the moisture level, the irrigation system could be fully automated. The one or more sensors may either be one or more sensors/gauges that monitor(s) and detect(s) a water level within the water control basin or it could be one or more sensors that detect(s) the moisture level within the porous layer or the above layer of the sports field layer at one or several locations.

In addition, the system may include a step that is interposed between a first water distribution board that is positioned lower than an adjacent water distribution board of the plurality of water distribution boards and is configured to follow a slope of the sports field layer. The system may be used with a pitcher's mound having a radial slope, and in that case the system includes at least one concentric step positioned on top of the water impermeable layer to follow the radial slope of the pitcher's mound.

In another particular aspect, a method of constructing a subsurface irrigation system for a sports field is disclosed. The method includes installing a substantially water impermeable layer on top of a compacted subgrade, positioning a plurality of water distribution boards on top of the water impermeable layer, connecting the plurality of water distribution boards to a water control basin that is configured to control a supply water to the water distribution boards, filling in over the plurality of water distribution boards with a porous layer comprising cement and particulate stone material, and spreading a sports field layer on top of the porous layer. The porous layer is configured to move water from the plurality of water distribution boards upwards to the sports field layer using capillary action. The method may also include installing a step between a first water distribution board positioned lower than an adjacent water distribution board of the plurality of water distribution boards to follow a slope of the sports field layer.

In the context of the present application a subsurface irrigation system is to be broadly interpreted and generally refers to at least one portion of an area having the components to be able to function in a connected network of a plurality of sub-systems. By components in the context of this application it is to be understood equipment or structural elements needed for functionality of a sub-system including constructing materials such as layers of sand, soil, turf, planted surfaces, fluid permeable and fluid impermeable layers, layers of rooting medium, any form of aggregate material, crushed stone, gravel, layers with porous properties, e.g., a mixture of cement and particulate stone such as Capillary Concrete™ which is commercially available from the applicant.

Other components included in or separately provided for each sub-system of the subsurface irrigation system may include pumping systems, pipes, conduits, valves, fluid connectors installed between sub-systems within the same area or sub-systems in other parts of the system, sensing systems, pressure and thermal control devices, fluid inlets and outlets, fluid injection lines, fertilizer or gas injection devices, etc. In other words, one subsurface irrigation system may comprise a variety of combinations of the components according to the intended use.

DETAILED DESCRIPTION

In the following detailed description, preferred embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention.

Figure 1:
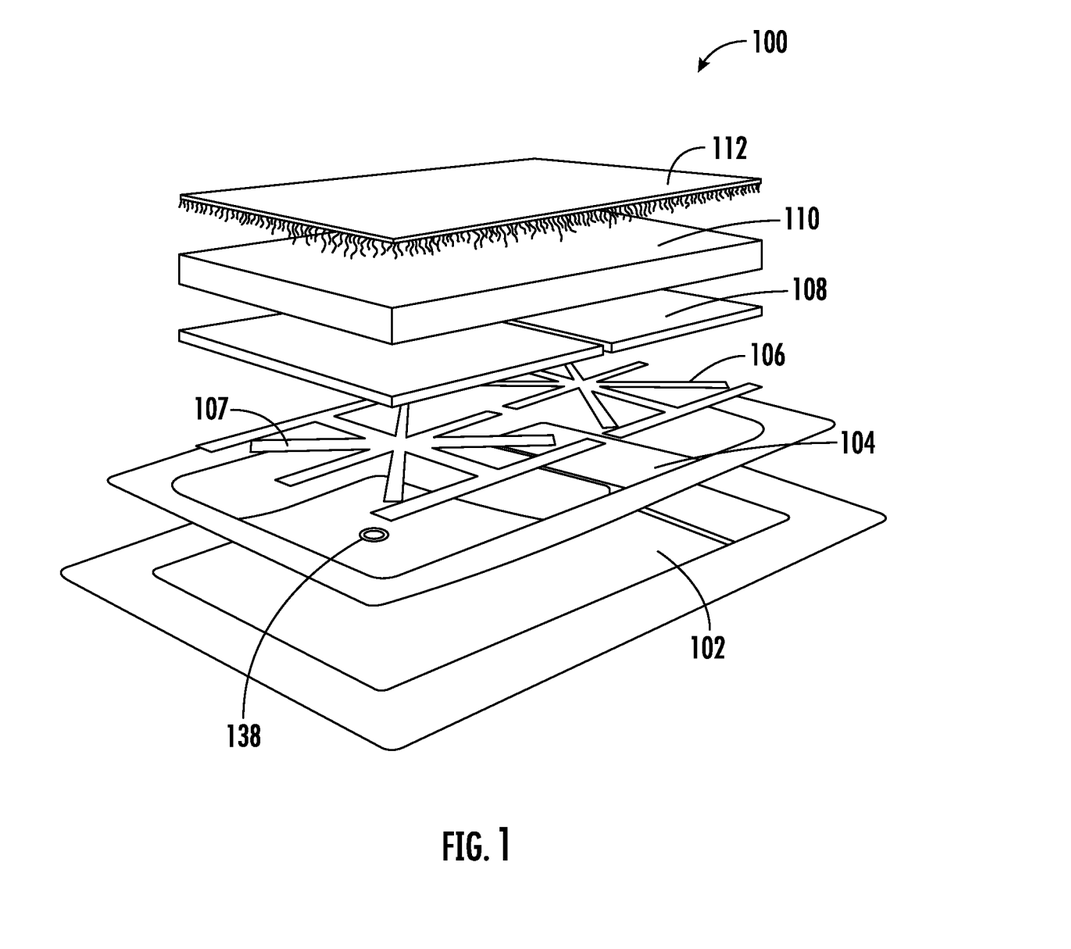
FIG. 1 is an exploded schematic of a distribution portion of a subsurface irrigation system for a sports field in which various aspects of the disclosure may be implemented.

In FIG. 1, an exploded perspective view of a subsurface irrigation system for a sports field of the invention is shown and generally designated 100. The system 100 includes a compacted subgrade 102 and a substantially water impermeable liner 104, such as a plastic or rubber sheet or any equivalent layer or membrane of material, installed on the compacted subgrade 102.

A plurality of water distribution boards 106 (e.g. waffle boards) are positioned on top of the liner 104. As those of ordinary skill in the art can appreciate, there are many configurations of water distribution boards 106 and the water distribution board illustrated is intended to be exemplary rather than limiting. A porous layer 108 is provided on top of the water distribution boards 106 and liner 104. The water distribution boards 106 include a plurality of feeders 107 that distribute water uniformly from a center inlet 138 to the outer edges.

In one exemplary embodiment, the porous layer 108 is a (concrete) mixture comprising cement and particulate stone material, such as e.g. Capillary Concrete™, which is commercially available by the present applicant, Capillary Concrete, LLC. The depth of the porous layer 108 may be approximately 3 inches, however, the depth is determined by the particular application.

In a particular aspect, the porous layer 108 may have a mixture comprising 15-40% by dry weight cement and 60-85% by dry weight particulate stone material, and wherein at least 75% of the particles of the particulate stone material are of sizes within the range 0.1-10 mm. In another aspect, at least 85% of the particles of the particulate stone material may be sizes within the range of 0.2-8 mm, or may have a maximum 10% of the particles of the particulate stone material are smaller than 3 mm, or may have a maximum 10% of the particles of the particulate stone material are smaller than 4.5 mm. The particulate stone material may comprise natural stones or crushed aggregate. The cement may comprise hydraulic cement, or a Portland cement or blended cement.

A sports field layer 110 comprising soil, clay, dirt, sand, or any combination thereof, serves as the playing surface and is filled on top of the porous layer 108. The subsurface irrigation system 100 is configured to keep the playing surface damp as water moves upwards from the water distribution boards 106 through the porous layer 108 using capillary action. The depth of the sports field layer 110 may be between 3 to 4 inches but will be determined by the particular application. Natural grass or artificial turf 112 can also be installed on top of the soil or sand layer 110.

The subsurface irrigation system 100 may be used to condition the infield dirt and/or grass areas of baseball fields, for example, including the pitching mound as discussed below. The system 100 is also applicable for artificial turf installations as well in order to cool the artificial turf and have a substantially flat pitch without a slope, which is required with other irrigations systems.

Figure 2:
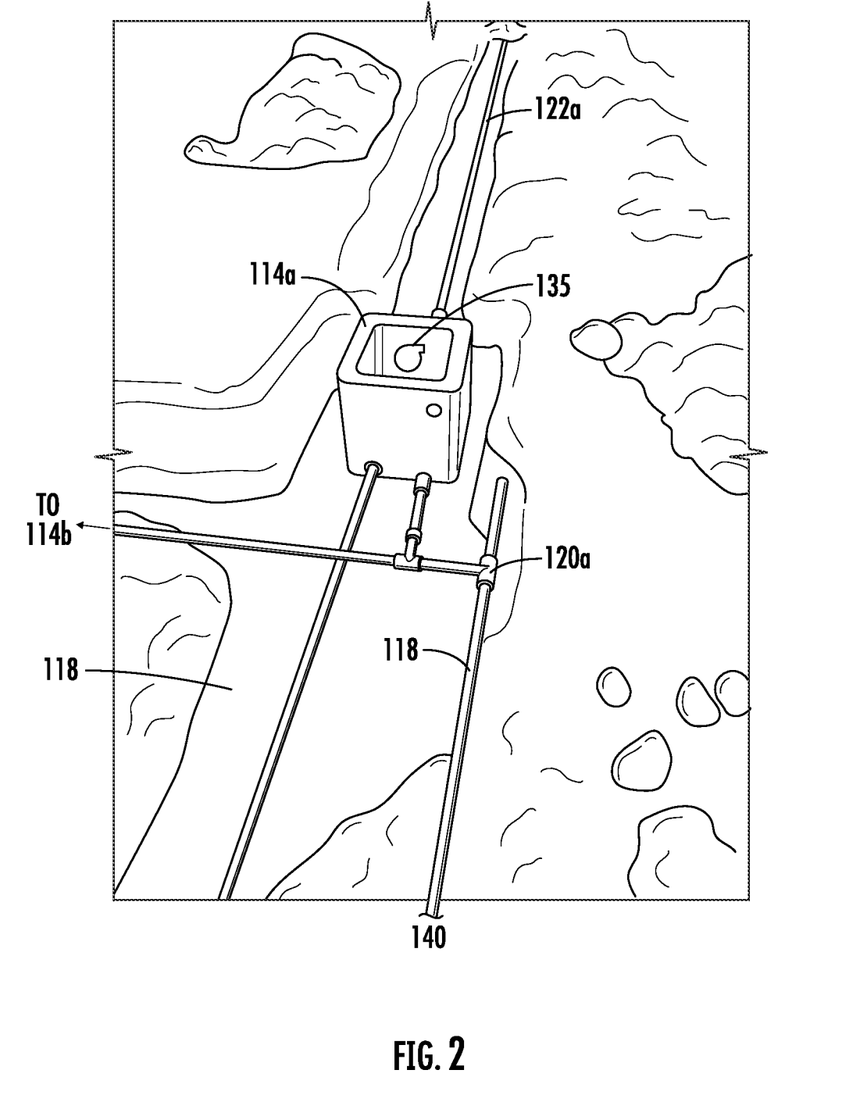
FIG. 2 is a perspective view of a water control basin and associated piping for connecting to the distribution portion of FIG. 1.

In a particular aspect, a water control basin 114a of the system 100 is typically positioned in a trench 118 at the peripheral edge of the compacted subgrade 102 as shown in FIG. 2. The water control basin 114a may alternatively be placed just about anywhere depending on the intended application. The water control basin 114a controls the flow of water to the water distribution boards 106 and in turn controls the moisture level of the porous layer 108 and consequently the moisture level of the above artificial turf, soil, and/or sand layer 110, 112. The water control basin 114a may also include or be in fluid communication with a pump 135 for distributing water to the water distribution boards 106 via distribution pipe 122a. The pump 135 may be further connected to a source pipe 120a which is connected to a remote reservoir or water source 140 and another water control basin 114b. There may be a plurality of pumps and pipes, each with a specific objective in the system, e.g. adding of liquid, removal of liquid, adding of fertilizer, drainage, etc.

The pump 135 is configured for addition and/or removal of liquid into/from the water control basin 114a. This facilitates the controlling of the moisture level of the porous layer 108, and if it were to be combined with at least one sensor 137a for detecting the moisture level, the irrigation system 100 could be fully automated. The one or more sensors 137a, 137b, 137c may either be one or more sensors/gauges 137a that monitor(s) and detect(s) a water level within the water basin 114a or it could be one or more sensors 137b that detect(s) the moisture level within the porous layer 108 or a sensor 137c for the above sports field layer 110 at one or several locations.

In operation, the water control basin 114a is filled with water from a water source 140. The water is provided from the water control basin 114a to the porous layer 108 via the water distribution boards 106 using gravity feed or pumps. The water distribution boards 106 are under the sports field layer 110 and are configured for the easy transport of water throughout the entire volume of the porous layer 108, and subsequently to the above sports field layer 110 through the use of capillary forces. The porous layer 108 may be kept constantly damp and moist which is beneficial for the sports field located above such as artificial turf or soil. The water evaporates through the artificial turf, for example, so that it cools by evaporation. Moreover, the softness of the field can be adjusted by adjusting the water levels in the system 100.

Figure 3:
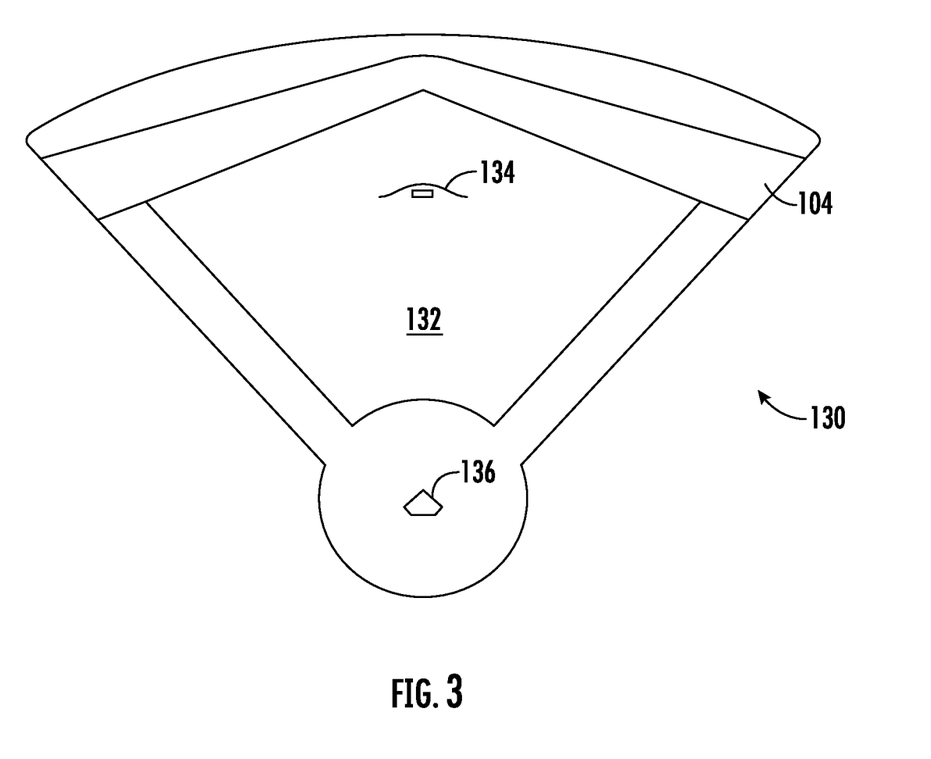
FIG. 3 is a perspective view of the liner for an infield area of a baseball sports field being installed with the subsurface irrigation system.

Referring now to FIG. 3, a perspective view of the liner 104 for an infield area 132 of a baseball sports field 130 being installed with the subsurface irrigation system 100 is shown. The field 130 includes home plate 136 and a pitcher's mound 134. The liner 104 is rolled out over the compacted subgrade 102 and is prepared for the water distribution boards 106 to be installed on top. In addition, a hole is cut in the liner 104 so that the distribution pipe 122a below the liner 104 can be connected to the inlet 138 for the water distribution boards 106.

Figure 4:
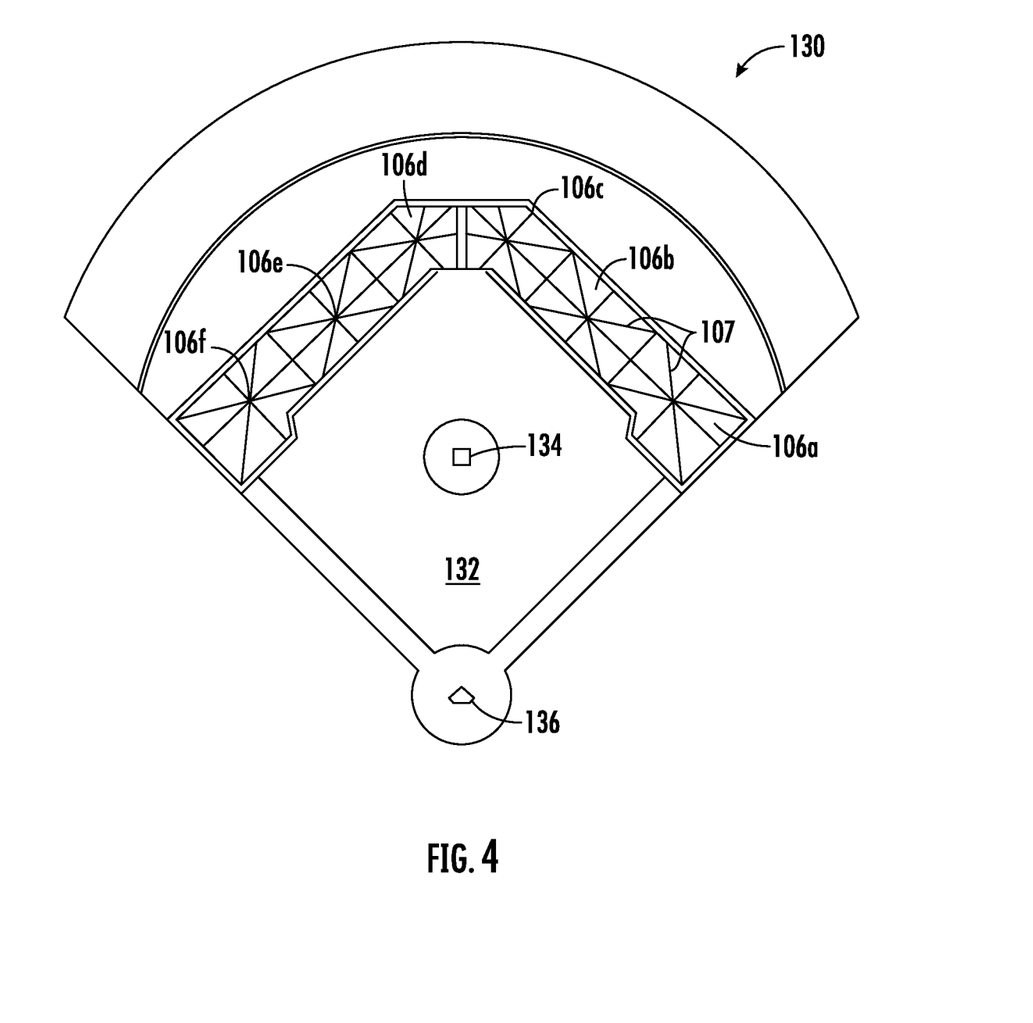
FIG. 4 is a perspective view of the water distribution boards positioned on top of the liner for the infield area shown in FIG. 3.

FIG. 4 is a perspective view of the water distribution boards 106a, 106b, 106c, 106d, 106e, 106f positioned on top of the liner 104 around the infield area of the field 130 shown in FIG. 3. Once the water distribution boards 106a-f are installed and connected to the respective distribution pipes, the porous material is placed on top to form the porous layer 108.

Figure 5:
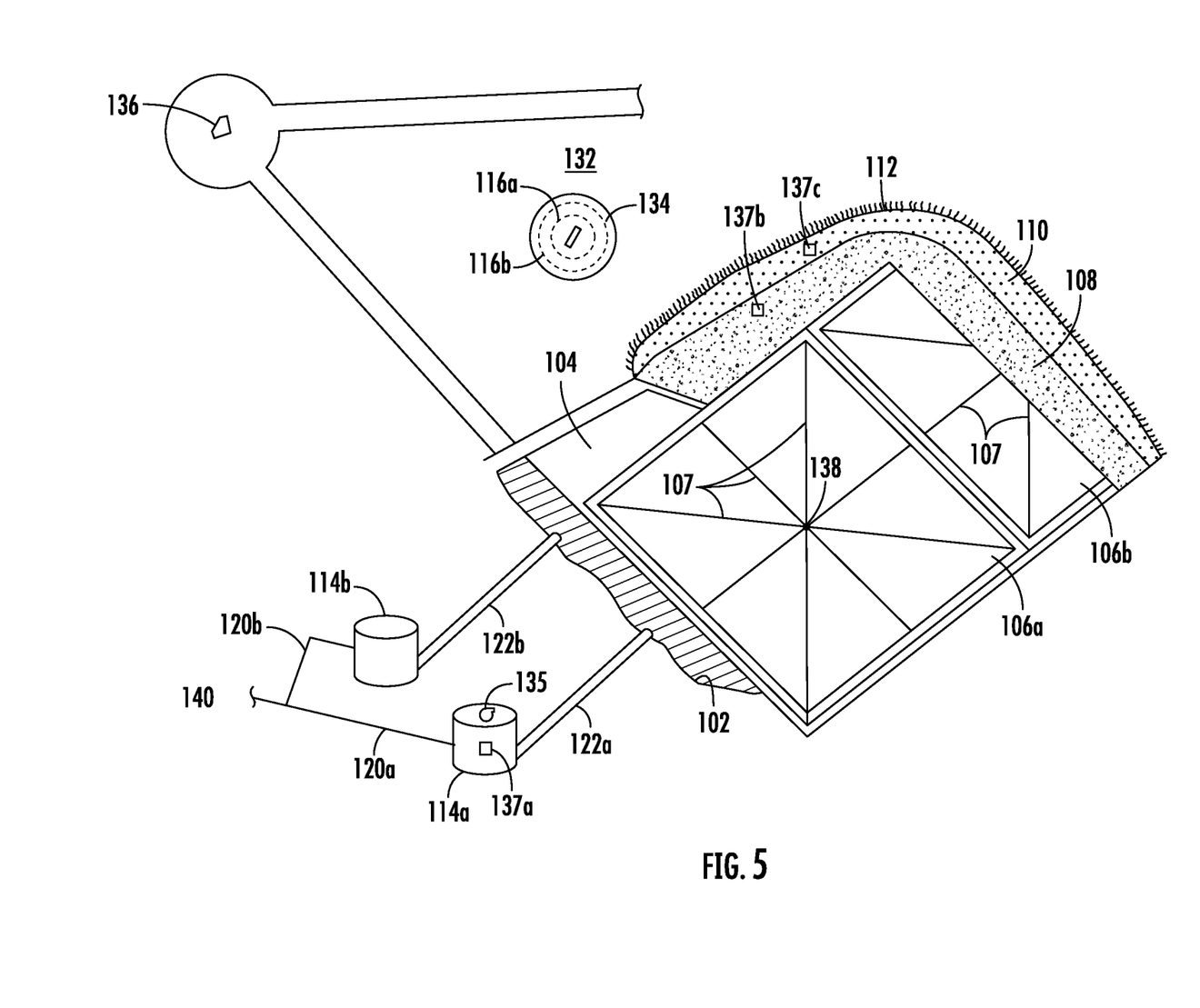
FIG. 5 is a schematic of the configuration and operation of the subsurface irrigation system for the baseball sports field.

Referring now to FIG. 5, a schematic of the configuration and operation of the subsurface irrigation system 100 for the baseball sports field is shown. The water distribution boards 106a, 106b are typically laid in herringbone or square patterns so that there is no area of the field that is more than six feet away from the closest water distribution board 106a, 106b. The plurality of feeders 107 distribute water uniformly from the center inlet 138 to the outer edges of the water distribution boards 106a, 106b.

The distribution pipes 122a, 122b run through the compacted subgrade 102 and under the liner 104 to the center of each of the water distribution boards 106a, 106b. The distribution pipes 122a, 122b come up through a hole in the liner 104 to connect to the respective water distribution board 106a, 106b.

As explained above, water control basins 114a, 114b are connected to a water source 140 via source pipes 120a, 120b. The water control basins 114a, 114b are in turn in fluid communication with the respective water distribution boards 106a, 106b via distribution pipes 122a, 122b.

Figure 6:
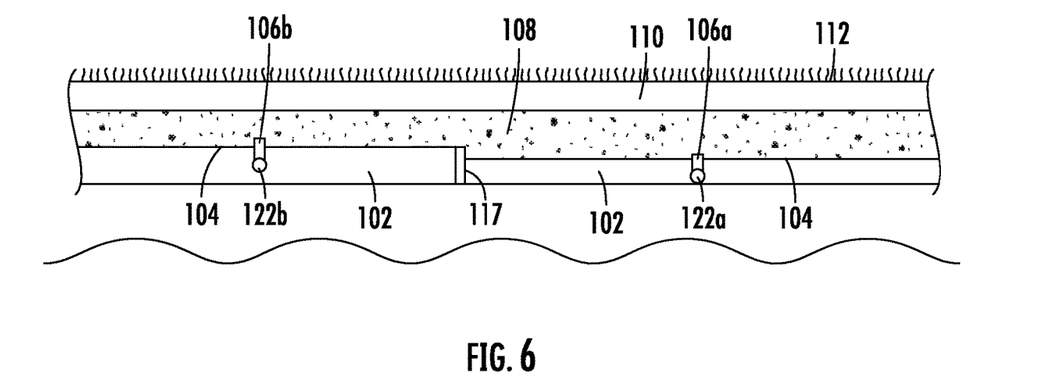
FIG. 6 is a cross sectional view of a portion of the subsurface irrigation system.

In addition, the field 132 may require a slope as shown in the cross section view of FIG. 6. The subsurface irrigation system 100 can accommodate the slope of the field 132 by using a stepped configuration. For example, a step 117, e.g., wood or foam board, may be used to separate two sections. Accordingly, the liner 104 runs up and over the step 117 from the lower section to the higher section.

Figure 7:
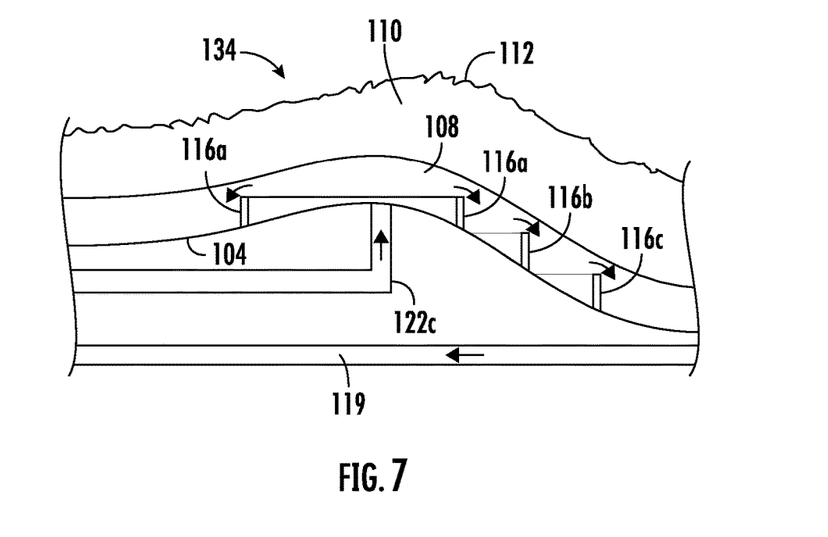
FIG. 7 is a schematic cross-sectional view of the subsurface irrigation system for a pitcher's mound of the baseball sports field of FIG. 5.

Referring now to FIG. 7 is a schematic cross-sectional view of the subsurface irrigation system 100 for a pitcher's mound 134 of the baseball sports field 130 of FIG. 5. In particular, the subsurface irrigation system is installed without a flat subsurface. To the contrary, the pitcher's mound 134 has a radial slope downwards from the pitching rubber to the infield 132 and is relatively steeply sloped. Accordingly, concentric steps 116a, 116b, 116c are positioned on the liner 104 at predetermined vertical distances from each other in stepped fashion. The water is fed to the highest elevation via pipe 122c and trickles down over the respective concentric step to the next lower level as shown in FIG. 7.

A method of constructing a subsurface irrigation system for a sports field includes installing a substantially water impermeable layer 104 on top of a compacted subgrade 102, positioning a plurality of water distribution boards 106 on top of the water impermeable layer 104, connecting the plurality of water distribution boards 106 to a water control basin 114a,b that is configured to control a supply water to the water distribution boards 106, filling in over the plurality of water distribution boards 106 with a porous layer 108 comprising cement and particulate stone material, and spreading a sports field layer 110 on top of the porous layer 108. The porous layer 108 is configured to move water from the plurality of water distribution boards 106 upwards to the sports field layer 110 using capillary action. The method may also include installing a step 117 between a first water distribution board 106a positioned lower than an adjacent water distribution board 106b of the plurality of water distribution boards to follow a slope of the sports field layer 110.

The present invention has here been disclosed in relation to sport fields, where it is considered to be particularly advantageous. However, it may also be implemented and used on other surfaces such as driving ranges, for example. Accordingly, such other obvious modifications must be considered to be within the scope of the present invention, as it is defined by the appended claims. It should be noted that the above-mentioned embodiments illustrate rather than limit the invention, and that those skilled in the art will be able to design many alternative embodiments without departing from the scope of the appended claims.

That which is claimed is:

1. A subsurface irrigation system for a sports field comprising:
   a substantially water impermeable layer;
   a plurality of water distribution boards positioned on top of the water impermeable layer;
   a step interposed between a first water distribution board positioned lower than an adjacent water distribution board of the plurality of water distribution boards to follow a slope of the sports field layer;
   a porous layer overlaying the water impermeable layer and the plurality of water distribution boards;
   a sports field layer on top of the porous layer;
   wherein the porous layer is configured to move water from the plurality of water distribution boards upwards to the sports field layer using capillary action.

2. The subsurface irrigation system of claim 1, wherein the sports field layer comprises sand, dirt, clay, or a combination thereof.

3. The subsurface irrigation system of claim 1, further comprising a compacted subgrade below the water impermeable layer and configured to carry the water impermeable layer.

4. The subsurface irrigation system of claim 1, wherein the sports field layer further comprises artificial turf.

5. The subsurface irrigation system of claim 1, wherein the sports field layer further comprises natural grass.

6. The subsurface irrigation system of claim 1, wherein the water impermeable layer comprises a plastic or rubber liner.

7. The subsurface irrigation system of claim 1, wherein the porous layer comprises a mixture of cement and particulate stone material.

8. The subsurface irrigation system of claim 1, wherein the plurality of water distribution boards each comprise an inlet and a plurality of feeders, the feeders of each of the water distribution boards are configured to distribute water uniformly from the inlet to outer edges of a respective water distribution board.

9. The subsurface irrigation system of claim 1, wherein the sports field layer comprises a pitcher's mound having a radial slope.

10. The subsurface irrigation system of claim 9, further comprising at least one concentric step positioned on top of the water impermeable layer to follow the radial slope of the pitcher's mound.

11. The subsurface irrigation system of claim 1, further comprising a water control basin in fluid communication with at least one water distribution board of the plurality of water distribution boards.

12. A subsurface irrigation system for a sports field comprising:
    a water control basin;
    a compacted subgrade;
    a liner carried by the subgrade;
    a water distribution system positioned on top of the liner and in fluid communication with the water control basin;
    a porous layer comprising a mixture of cement and particulate stone material overlaying the liner and the water distribution system; and
    a sports field layer on top of the porous layer;
    wherein the sports field layer comprises a pitcher's mound having a radial slope, and further comprising at least one concentric step positioned on top of the liner to follow the radial slope of the pitcher's mound;
    wherein the porous layer is configured to move water from the water distribution system upwards to the sports field layer using capillary action.

13. The subsurface irrigation system of claim 12, wherein the sports field layer comprises sand, dirt, clay, or a combination thereof.

14. The subsurface irrigation system of claim 13, wherein the sports field layer further comprises artificial turf.

15. The subsurface irrigation system of claim 13, wherein the sports field layer further comprises natural grass.

16. The subsurface irrigation system of claim 12, wherein the water distribution system comprises a plurality of water distribution boards that each comprise an inlet and a plurality of feeders, the feeders of each of the water distribution boards are configured to distribute water uniformly from the inlet to outer edges of a respective water distribution board.

17. A method of constructing a subsurface irrigation system for a sports field, the method comprising:
    installing a substantially water impermeable layer on top of a compacted subgrade;
    positioning a plurality of water distribution boards on top of the water impermeable layer;
    installing a step between a first water distribution board positioned lower than an adjacent water distribution board of the plurality of water distribution boards to follow a slope of the sports field layer;
    connecting the plurality of water distribution boards to a water control basin that is configured to control a supply water to the water distribution boards
    filling in over the plurality of water distribution boards with a porous layer comprising cement and particulate stone material; and
    spreading a sports field layer on top of the porous layer;
    wherein the porous layer is configured to move water from the plurality of water distribution boards upwards to the sports field layer using capillary action.

* * * * *